(12) United States Patent
Prakapenka et al.

(10) Patent No.: US 12,392,729 B2
(45) Date of Patent: Aug. 19, 2025

(54) OPTICAL INSPECTION OF A COMPONENT

(71) Applicant: MB Automation GmbH & Co. KG, Roding (DE)

(72) Inventors: Uladimir Prakapenka, Roding (DE); Christina Breu, Chamerau (DE)

(73) Assignee: MB Automation GmbH & Co. KG, Roding (DE)

( * ) Notice: Subject to any disclaimer, the term of this patent is extended or adjusted under 35 U.S.C. 154(b) by 125 days.

(21) Appl. No.: 18/557,167

(22) PCT Filed: Apr. 5, 2022

(86) PCT No.: PCT/EP2022/058978
§ 371 (c)(1),
(2) Date: Oct. 25, 2023

(87) PCT Pub. No.: WO2022/233521
PCT Pub. Date: Nov. 10, 2022

(65) Prior Publication Data
US 2024/0219310 A1 Jul. 4, 2024

(30) Foreign Application Priority Data
May 7, 2021 (DE) ...................... 10 2021 111 953.7

(51) Int. Cl.
G01N 21/88 (2006.01)
G01N 21/95 (2006.01)
G01N 35/10 (2006.01)

(52) U.S. Cl.
CPC ..... G01N 21/8806 (2013.01); G01N 21/9503 (2013.01); G01N 35/109 (2013.01); G01N 2201/0415 (2013.01)

(58) Field of Classification Search
CPC .......... G01N 21/8806; G01N 21/9503; G01N 35/109; G01N 2201/0415
See application file for complete search history.

(56) References Cited

U.S. PATENT DOCUMENTS 4,619,043 A 10/1986 Takahashi et al.
5,750,979 A 5/1998 Yamamoto et al.
(Continued)

FOREIGN PATENT DOCUMENTS

DE 19913134 A1 10/1999
DE 102015013500 A1 4/2017
(Continued)

Primary Examiner — Kevin K Pyo
(74) Attorney, Agent, or Firm — John A. Miller; Shumaker, Loop & Kendrick, LLP

(57) ABSTRACT

A device for optical inspection of a component located on a fixture. The fixture picks up the component at a delivery point, conveys it along a conveying path to a deposit point, and deposits it there. A light source delivers light at a first acute angle to the optical axis of an imaging sensor onto a first end face of the component when the component located at the holder is oriented with its end face at least normal to the optical axis of the imaging sensor. The latter inspects at least one side surface of the component and/or an area inside the component near a second of the end surfaces and near respective ones of the side surfaces. The imaging sensor detects light emerging from the first end face to signal a distribution of the intensity of the emerging light to an evaluation device.

22 Claims, 4 Drawing Sheets

(56) References Cited

U.S. PATENT DOCUMENTS

| | | |
|---|---|---|
| 7,191,511 B2 | 3/2007 | Noda et al. |
| 8,948,905 B2 | 2/2015 | Prakapenka et al. |
| 9,510,460 B2 | 11/2016 | Cheung et al. |
| 9,772,230 B2 | 9/2017 | Ehbets et al. |
| 11,217,465 B2 * | 1/2022 | Koch ................ H05K 13/0409 |
| 2003/0010930 A1 | 1/2003 | Thorwirth |
| 2015/0015877 A1 | 1/2015 | Smith et al. |
| 2015/0237309 A1 | 8/2015 | Heilmann |
| 2017/0284943 A1 | 10/2017 | Ghosh et al. |
| 2018/0308727 A1 | 10/2018 | Junker et al. |

FOREIGN PATENT DOCUMENTS

| | | |
|---|---|---|
| DE | 102017008869 B3 | 10/2018 |
| DE | 102019125127 A1 | 3/2021 |
| DE | 102019125134 A1 | 3/2021 |
| EP | 0906011 A2 | 3/1999 |
| EP | 2075829 B1 | 10/2011 |
| EP | 1470747 B1 | 5/2014 |
| JP | H01193630 A | 8/1989 |
| JP | H02193813 A | 7/1990 |
| JP | H08227904 A | 9/1996 |
| JP | 2001074664 A | 3/2001 |
| JP | 2007095725 A | 4/2007 |
| JP | 4911714 B2 | 4/2012 |
| JP | 2012116529 A | 6/2012 |
| JP | 5510923 B2 | 6/2014 |
| JP | 5783652 B2 | 9/2015 |
| JP | 5975556 B1 | 8/2016 |
| TW | 201503278 A | 1/2015 |
| TW | 201941315 A | 10/2019 |
| TW | 202113338 A | 4/2021 |
| WO | 2002054480 A1 | 7/2002 |
| WO | 2012073285 A1 | 6/2012 |
| WO | 2012076189 A1 | 6/2012 |
| WO | 2013084298 A1 | 6/2013 |
| WO | 2013108398 A1 | 7/2013 |
| WO | 2014112041 A1 | 7/2014 |
| WO | 2015083211 A1 | 6/2015 |
| WO | 2017022074 A1 | 2/2017 |

* cited by examiner

Si- Material
Light: infrared ca. 900 nm
Temperature: ca. 300 K

Refraction index n: ca. 3.6

$beta = \arcsin(\sin(alpha)/n)$ alpha: ca. -45 ° ... +45 °, e.g. approx. 33°
beta: ca. -11.2 ° ... +11.2 °, e.g. approx. 8.7°

OPTICAL INSPECTION OF A COMPONENT

CROSS-REFERENCE TO RELATED APPLICATIONS

This application is a National Stage application of International Application No. PCT/EP2022/058978 filed Apr. 5, 2022, which claims priority to German Patent Application Serial No. DE 10 2021 111 953.7 filed May 7, 2021.

BACKGROUND

Field

A component inspection is described here, which in particular can also be part of a component handling device. This component inspection is explained in interaction with the component handling device. Details of this are defined in the claims; the description and the drawing also contain relevant information about the system and the mode of operation as well as about variants of the system.

Discussion of the Related Art

A component here is, for example, a (electronic) semiconductor component, also referred to as a "chip" or "die". Such a component usually has a prismatic shape, a substantially polygonal, for example quadrangular (rectangular or square) cross-section with several lateral surfaces as well as a bottom surface and a top surface. The shell surfaces as well as the bottom surface and the top surface of the component are hereinafter generally referred to as side surfaces. The bottom surface and the top surface are also referred to as end surfaces. With four lateral surfaces and two approximately square end faces, the component has an approximately cuboid shape, since the height/thickness of the component is generally less than the edge lengths of the lateral surfaces in the longitudinal/transverse direction of the component. The component may also have a number of lateral surfaces different from four. The semiconductor component is manufactured, for example, using planar technology from a semiconductor single crystal wafer (for example silicon) through a large number of steps, with several hundred ICs on the Si wafer at the end of the process. By scribing, breaking or sawing (with laser or by mechanical material removal), the wafer is divided into individual components, each comprising one or more integrated circuits. A component can also be an optical component (prism, mirror, lens, etc.). Overall, a component can have any geometric shape.

From the operational practice of the applicant, so-called pick-up and set-down devices are known, in which components are individually picked up from a substrate with a pick-up tool and subsequently set down on a carrier or in a transport container or the like. Between picking up the component from the substrate and depositing the component, an inspection of the component usually takes place. For this purpose, images of one or more external side surfaces of the component are recorded with one or more imaging sensors and evaluated by means of automated image processing.

EP 0 906 011 A2 concerns a device for removing and loading electrical components on a substrate. The device comprises a rotatable transfer device which removes the electrical components from a feed module at a pick-up position and transfers them to a suction belt for further processing at a first transfer position. By means of a rotatable placement head, the components are picked up from the suction belt and transported to a second transfer position.

WO 02/054480 A1 relates to a device for optically inspecting various surfaces of a chip to be mounted. The device comprises a first, upper transport drum, which is arranged to remove the chips from a feed unit and transport them to a first transfer position. The chips are held in suction apertures formed on the peripheral surface of the upper transport drum, and moved by rotating the upper transport disk. The device further comprises a second, lower transport disk formed corresponding to the upper transport disk, which receives the removed chips at the first transfer position and transports them to a second transfer position. The device enables inspection of the chips by cameras arranged laterally next to the transport discs, which inspect the chips on their upper and lower sides. The chips are transferred unflipped relative to their original orientation to a sorting device for further processing.

U.S. Pat. No. 4,619,043 discloses an device and a method for removing and attaching electronic components, in particular chips, to a printed circuit board. The device comprises a transport means for picking up the chips in pick-up units and for transporting the picked-up chips to a first transfer position. The conveying means comprises a conveying chain and a rotatable sprocket, which are engaged together. The device further comprises a rotatable mounting tool having placement heads for picking up the chips at the first transfer position. The fastening tool is further adapted to convey the picked-up chips to a second transfer position by means of a rotary movement, whereby the chips are turned over.

JP 2-193813 relates to a device for picking up and turning over electronic components inspected by inspection devices. The device comprises a feeding unit from which electronic components are taken by a first rotating body and arranged at its circumference. A rotary motion of the rotating body transports the components to a first transfer position, turning them about their longitudinal or transverse axis. The device further comprises a second rotating body, which picks up the removed electronic components at the first transfer position and transports them to a second transfer position. Thereby, a further turning of the electronic components about their longitudinal or transverse axis takes place. The device allows inspection of different sides of the components.

Components are inspected visually, among other things, before being housed in a ceramic or plastic package and having external connections made. During the disassembly of the wafer into individual components, mechanical stresses occasionally occur, particularly at the lower edge of the component, namely in its interior, which cause a circuit layer to detach from adjacent layers. The separation of the wafer into individual components also leads to unevenness on the separated sidewall, in particular on the edge of the sidewall facing away from the laser. This separation area/edge is also referred to as a laser groove (LG) when the wafer is cut by laser. Common imaging sensors are usually not able to detect such defects. Defects (breakouts) on the component in the laser groove area are to be detected by suitable inspection. By detecting, for example, a detachment of a semiconductor or metal layer from the silicon body, the defective component can be sorted out of the further processing sequence and thus a reduction in the lifetime of the later products can be avoided.

At the same time, the demands of the semiconductor processing industry to be able to optically detect ever smaller defects in the components are increasing. The optical detection of some types of defects is possible with adapted lenses and coordinated illumination of the components to be inspected. However, the lenses available reach their limits when it comes to the required image sharpness and the associated decreasing depth of field.

Due to the scattering of the positions of the components on the holder tool and the shallow depth of field of the lenses, the quality of the optical inspection is limited. Defects are detected with a lower probability on out-of-focus components. This means that defective components are incorrectly not recognized as non-functional and are further processed/packaged.

Further technological background is also provided in EP 2 075 829 B1, EP 1 470 747 B1, JP 59 75 556 B1, WO 2014 112 041 A1, WO 2015 083 211 A1, WO 2017 022 074 A1, WO 2013 108 398 A1, WO 2013 084 298 A1, WO 2012 073 285 A1, U.S. Pat. No. 9,510,460 B2, JP 49 11 714 B2, U.S. Pat. No. 7,191,511 B2, JP 55 10 923 B2, JP 57 83 652 B2, JP 2007 095 725 A, JP 2012 116 529 A, JP 2001-74664 A, JP 1-193630 A, U.S. Pat. No. 5,750,979, DE 199 13 134 A1, JP 8 227 904 A, DE 10 2015 013 500 A1, DE 10 2017 008 869 B3, DE 10 2019 125 127 A1 illustrated.

The solution presented here is intended to provide an improved, safe and fast inspection of components at high throughput compared to the state of the art.

SUMMARY

A device and a method are disclosed here. The device is used for optical inspection of a component located on a holder. The fixture is designed and intended to pick up the component at a delivery point, to convey it along a conveying path to a deposit point, and to deposit it at the deposit point. A light source is configured and intended to emit light incident at a first acute angle to the optical axis of an imaging sensor on a first of the faces of the component when the component located at the holder is oriented with the first of its faces at least approximately normal (about 90°±about 10°) to the optical axis of the imaging sensor. The imaging sensor is configured and intended to optically inspect at least one of the side surfaces of the component conveyed by the holder and/or at least one region in the interior of the component proximate a second of the end surfaces and proximate respective ones of the side surfaces. The imaging sensor is configured and intended to detect light emerging from the first of the end faces of the component and to signal a distribution of the intensity of the emerging light to an evaluation device. The evaluation device is set up and intended, depending on the signaled distribution of the intensity of the emerging light, to detect unevenness at least in sections on a side surface of the component and/or to detect detachments of at least one layer in sections in the region of a second of the end surfaces.

Emitting light at an acute angle to the optical axis of an imaging sensor onto an end face of the component means that this light has a principal axis of radiation in space along which the light has at least nearly the greatest radiance, this principal axis of radiation including the acute angle (<90°) with the optical axis of an imaging sensor oriented normal to the first of the end faces of the component.

The device disclosed herein can be used to detect
(i) unevenness on one or more detached sidewalls of the device, and/or
(ii) a detachment of a semiconductor or metal layer from the silicon body on the conveying path between the delivery point and the deposition point at the same inspection position and with the same imaging sensor.
Also (iii) defects on the end faces of the component can be detected in this way, as they create a black area in the image of the imaging sensor; again, the beams do not penetrate the component and are consequently not reflected at the side faces.

In a variant of the device, the holder is guided from the delivery point to the deposit point along a conveyor path on which the component conveyed through the holder passes an optical device comprising one or more deflecting and/or focusing devices arranged and intended to direct light emerging from the first of the faces of the component toward the imaging sensor.

In a variant of the device without the fixture, the laser groove is to be detected on a component already placed in a pocket. In this variant, the entire optical assembly is oriented to face the pocket from above, for example, and inspects one of the component's end faces.

In a variant of the device, the light source is arranged and intended to provide at least one light strip incident at the acute angle in an edge region of the component on the first of the end faces of the component.

In a variant of the device, the acute angle of light directed at the component is determined as a function of the refractive index of the material of the component, the wavelength, and/or the height of the component between about −45° and about +45°, between about +5° and about +45°, between about +15° and about +45°, between about +25° and about +45°, or between about +30° and about +45°.

In a variant of the device, the light source is adapted to emit infrared light with a wavelength between about 780 nm and about 1000 nm, and in the case that the component has a silicon-containing substrate material and the temperature of the substrate material is about 300° K±about 10° K, the acute angle of the light directed onto the component is about 33°±about 3°. Depending on the substrate material of the component, light with higher wavelengths can also be used, for example SWIR (short wave IR) up to about 1500 nm.

In a variant of the device, the acute angle alpha1 of the light directed onto the component is determined in such a way that, in the case of a component inspected as being in order, the light (i) is reflected inside the component on a side surface of the component to be inspected, and/or (ii) is reflected inside the component in the region of an end surface of the component facing the pick-up, and (iii) emerges as outgoing light at the acute angle alpha2 to the optical axis of the imaging sensor from the end face of the component facing away from the holder towards the imaging sensor in such a way that the magnitude of the second acute angle alpha2 deviates at most slightly from that of the first acute angle alpha1.

In a variant of the device, the deviation of the magnitude of the second acute angle from that of the first acute angle, which is at most slight, is no more than about ±10°.

In a variant of the device, the acute angle of the light directed onto the component is determined such that, when the component is inspected as being OK, the light is reflected (i) inside the component at a side surface of the component to be inspected, and (ii) inside the component in the region of an end surface of the component facing the holder, and (iii) emerges as outgoing light at the acute angle to the optical axis of the imaging sensor from the end surface of the component facing away from the holder towards the imaging sensor.

In a variant of the device, the holder is part of a first turning device, which is set up to rotate about a first turning axis and, in doing so, to pick up the component at the first delivery point, to convey it to the first deposit point, and to deposit it at the first deposit point. In a variant of the device, the holder is part of a second turning device, which is set up and intended to rotate a second turning axis and thereby take over the component at a takeover point from a holder of the first turning device, convey it to a second deposit point, and deposit it at the second deposit point. In a variant of the device, the first turning axis and the second turning axis are spaced apart from each other, and offset from each other by an angle of about 90°. In a variant of the device, the holder of the first turning device and the holder of the second turning device are aligned with each other at the transfer point in such a way that the component is to be transferred from the first turning device to the second turning device.

In a variant of the device, the distance between the holder (with the component) passing through the optical device and the light deflecting and/or focusing devices is to be varied (for example by adjusting devices or by adjusting drives) in such a way that the component conveyed by the holder can be detected optically by the imaging sensor at least between the first and the second of the end faces of the component along the optical axis of the imaging sensor. In other words, in a variant of the device, the optics (light redirecting and/or scattering/and/or focusing and/or polarizing means) for the imaging sensor are to be focused such that the optics feed an image to the imaging sensor from the interior, such as the space near the second of the end faces of the component. In this way, the layer delaminations at the second of the component's end faces can be reliably detected, displayed and evaluated.

A support unit with a through aperture located in the support unit is provided for supporting a plurality of, for example, four light deflection devices. In a variant, the light deflection devices are arranged around the through aperture. The support unit is to be moved or adjusted along the optical axis of the imaging sensor, whereby the entirety of the plurality of light redirecting devices is to be displaced along the optical axis of the imaging sensor. In a variant of the device, an adjustment means for a selection of the plurality of light redirecting devices is provided to displace said selection along the optical axis of the imaging sensor. In a variant of the device, the support unit is arranged and intended to support at least one light source for each of the light deflection devices arranged around the through aperture, the at least one light source being arranged, and preferably adjustable, on the support unit in such a way that light emitted by it falls, preferably through the through aperture, onto the first of the end faces of the component to be inspected as it passes the optical device.

In order to achieve optimal focusing of the imaging sensor on a region of interest of the component, in a variant the support unit together with all (for example four) light deflection devices (for example prisms or mirrors) is moved by means of a servo drive between the imaging sensor and the component, preferably along the optical axis of the imaging sensor. The two light deflection devices, which are not adjustable (in distance to the component), are optimally focused by the drive of the carrying unit. In another variant, the support unit is also preferably to be moved along the optical axis of the imaging sensor. Then, in the case of a component that is not square in plan view (i.e., for example, rectangular in plan view) and whose four side surfaces and/or an area near the end surface located on the holder are to be inspected with the device, two opposing light deflection devices can be readjusted in each case by a further servo drive arranged on the support unit. The two adjustable light deflection devices (at a distance from the component) are focused by the additional servo drive.

Also disclosed herein is an optical component inspection method for inspecting a component located at a holder, comprising the steps of:

picking up the component at a discharge location, conveying it along a conveying path to a deposit location, and depositing it at the deposit location;

emit light from a light source that is incident on a first of the faces of the component at a first acute angle to the optical axis of an imaging sensor;

orient the light source such that, when a component is inspected as being OK with respect to unevenness on a side surface of the component and/or delamination of at least one layer in the region of a second of the end faces, the light emerges from the first of the end faces of the component at a second acute angle to the optical axis of the imaging sensor such that the magnitude of the second acute angle differs at most slightly from that of the first acute angle;

using the imaging sensor to optically inspect at least one of the side surfaces of the component conveyed by the holder and/or at least one region in the interior of the component close to a second of the end surfaces and close to respective ones of the side surfaces;

using the imaging sensor to detect the light emerging from the first of the end surfaces of the component and to signal a distribution of the intensity of the emerging light to an evaluation device;

using the evaluation device, depending on the signaled distribution of the intensity of the emerging light, to detect, at least in sections, unevenness on a side surface of the component and/or, at least in sections, detachment of at least one layer in the region of a second of the end surfaces.

In a variant of the method, the holder guides the component from the delivery point to the deposit point along a path in which the component conveyed by the holder passes an optical device comprising one or more deflecting and/or focusing devices that direct light emerging from the first of the component's end faces toward the imaging sensor.

In a variant of the method, at least one light strip is provided from the light source, the light strip being incident on the first of the faces of the component at the acute angle in an edge region of the component.

In a variant of the method, the acute angle of light directed at the component is determined as a function of the refractive index of the material of the component, the wavelength and/or the height of the component, between about −45° and about +45°, between about +5° and about +45°, between about +15° and about +45°, between about +25° and about +45°, or between about +30° and about +45°.

In a variant of the method, infrared light is emitted from the light source with a wavelength between about 780 nm and about 1000 nm (or (short wave IR) up to about 1500 nm), and in the case that the component has a silicon-containing substrate material and the temperature of the substrate material is about 300° K±about 10° K, the acute angle (alpha1) of the light directed onto the component is determined to be about 33°±about 3°. This determination can be achieved, for example, by temporary, one-time or component-specific adjustment of the orientation of the light source by means of an adjustment drive or an adjustment setting device.

In a variant of the method, the deviation of the magnitude of the second acute angle from that of the first acute angle, which is at most slight, is no more than about ±5°.

In a variant of the method, the acute angle of the light directed onto the component is determined such that, for a component inspected as "OK", the light is reflected (i) inside the component at a side surface of the component to be inspected, and (ii) inside the component in the region of an end surface of the component facing the holder, and (iii) as outgoing light at the acute angle to the optical axis of the imaging sensor emerges from the end face of the component facing away from the holder towards the imaging sensor (with at most a slight deviation of the magnitude of the second acute angle from that of the first acute angle by no more than about ±5°).

In a variant of the method, the holder rotates at a first turning device about a first turning axis, and in doing so picks up the component at the first delivery point, conveys the component to the first deposit point, and deposits the component at the first deposit point; and/or rotates the holder at a second turning device about a second turning axis, and thereby takes over the component at a takeover point from a holder of the first turning device, conveys the component to a second deposit point, and deposits the component at the second deposit point, wherein the first turning axis and the second turning axis are spaced apart from one another, and are offset from one another by an angle of approximately 90°, and wherein at the transfer point the receiving means of the first turning device and the receiving means of the second turning device are aligned with one another in such a way that the component is to be transferred from the first turning device to the second turning device.

In a variant of the method, the holder is guided from the delivery point to the deposit point along a path where the component conveyed by the holder passes an optical device, and/or one or more light redirecting and/or focusing devices of the optical device direct light emerging from the first of the component's end faces toward the imaging sensor.

In a variant of the method, the holder passing through the optical device and the light deflecting and/or focusing devices are varied in their distance from each other such that the component conveyed by the holder is optically detected by the imaging sensor at least in its interior between the first and the second of the end faces of the component along the optical axis of the imaging sensor.

In a variant of the method, a support unit equipped with a through-hole located in the support unit carries a plurality of, for example, four light-deflecting devices; the light-deflecting devices are arranged around the through-hole; the support unit is moved or adjusted along the optical axis of the imaging sensor, thereby displacing the entirety of the plurality of light-deflecting devices along the optical axis of the imaging sensor; an adjusting means displaces a selection of the plurality of light deflecting means along the optical axis of the imaging sensor; and/or the support unit carries at least one light source for each of the light deflecting means arranged around the through aperture, wherein the at least one light source is arranged, and preferably adjusted, on the support unit such that light emitted thereby falls, preferably through the through aperture, onto the first of the end faces of the component to be inspected as it passes the optical means.

By at least one light source to each of the light redirecting devices arranged around the through-aperture are meant, for example, LED lines with 1-10 (IR) LEDs. However, it is also possible to direct the light from one or a few light sources ((IR) LEDs) by means of light guides to the light deflection devices arranged around the through-aperture, or to shine the light directly onto the component by means of the (IR) light from the light guides. Depending on the spatial conditions, coaxial illumination can also be used instead of the LED array if there is more space available.

Thus, the arrangement presented here forms an integrated handling/inspection device. Imaging sensors inspect all or almost all top and/or side surface(s) of a component.

The device presented here picks up components from a component supply (wafer disk) arranged, for example, horizontally in the upper area of the device with an ejector unit that is, for example, stationary. Relative to this ejection unit, the component supply moves in the plane. The ejection unit causes the components to be released individually from the component supply by a needle or without contact (e.g. by a laser beam) and to be picked up by a holder. The ejected components are fed to one or more inspection processes and finally deposited. Bad parts can be rejected in the process. The optical inspection of the component, which is integrated into the transfer process, is divided into several inspection processes. The conveying/transport of the components takes place while the holders of the turning devices hold one component at a time. A held component passes through individual examination processes during transport. The acquired (image) data from the imaging sensors can also be used to coordinate the position control of the manipulators (holders) and the receiving points. The component conveyor is set up to convey a component along its path in a substantially continuous or clocked manner.

The arrangement and procedure presented here functionally combines two aspects: Handling and Inspection. These two functions are temporally and spatially interwoven for the fast and precise qualitative assessment of several/all side surfaces and/or the interior of the components, while these are quickly taken singly from the component supply and precisely deposited at the receiving point(s) classified as good parts by the inspection.

The component handling device has two turning devices, preferably operated in a controlled manner, preferably arranged essentially orthogonally (90° plus minus up to 15°) to each other and approximately star-shaped or wheel-shaped. The turning devices could also have a rectangular shape. Each of these turning devices carries a number of holders which, in some variants, can also be moved radially with respect to their axis of rotation in order to feed the components, each fixed on a holder by negative pressure, within a pivoting angle between component transfer and transfer to one or more process stations for inspection, rejection of bad parts and, if necessary, further stations.

In the device presented here, the star-shaped or wheel-shaped turning devices carry the components on radially outward-facing holders arranged on the (imaginary) circumference of one or both turning devices. This is to be seen in contrast to such devices in which the holders of one or both turning devices are oriented parallel to their axis of rotation.

The (upper/lower) top and/or (lateral) lateral surface(s) of a component detected by the imaging sensors in the individual examination processes can be different top and/or lateral surfaces of the component.

One aspect of the optical inspection provides for the component conveyor with a component to complete the conveyor path with essentially no or near standstill. In this case, the imaging sensor captures the desired images during the movement or during the minimal downtime. These images are then evaluated using image processing methods. A variant of this optical acquisition/examination provides that one or more color cameras or black-and-white cameras are provided as imaging sensors.

The imaging sensors may have one or more mirrors, optical prisms, lenses, polarizing filters or the like as light deflecting and/or scattering and/or focusing and/or polarizing devices, etc., for this purpose.

The light sources can be switched on briefly by a control arrangement in each case at the moment when the image with the component is located in the respective detection range of the imaging sensor, so that the component can be exposed with a brief flash of light for detection by the respective imaging sensor. Alternatively, permanent illumination can be used.

In a variant, the device is assigned a dispensing device which is set up to dispense one component at a time from the structured component supply to a holder of the first turning device positioned accordingly by the control system. This can be a component ejector which ejects the component through the wafer carrier film by means of a needle, or a laser pulse generator which specifically reduces the adhesive force of the component on the carrier film and thus detaches the component from the carrier film. In a variant, a position and/or property sensor is assigned to the dispensing device, which is set up to detect the position of the dispensing device relative to the component to be dispensed and/or position data of the component to be dispensed and/or properties of the component to be dispensed and to make them available to the controller for actuating the dispensing device.

In the device, in a variant, the holders of the first and/or the second turning device are set up to be extended and retracted in a controlled manner radially with respect to the axis of rotation or the center of rotation of the respective turning device, and/or to be subjected to negative pressure and/or positive pressure in a controlled manner for receiving and discharging a component to be conveyed, and/or to be immovable about their respective radial axis of movement, or to be rotated about their respective radial axis of movement through a rotation angle in a controlled manner.

In a device of this type, in a variant, linear drives assigned to the holders of the first and/or the second turning device are provided for radial extension/retraction at the dispensing point, the transfer point between the first and second turning devices. These linear drives engage in the correspondingly positioned holders from outside the respective turning devices and radially extend and retract the respective holder. In another variant, these linear drives merely extend the respective holders, while a return spring retracts the respective holders. In a further variant, a bidirectional or unidirectional radial drive is assigned to each of the holders.

In a variant of the component handling device, valves provide a supply of negative pressure and positive pressure to each of the individual holders individually and according to position in order to realize the functions: (i) suction of the component, (ii) holding of the component, (iii) depositing of the component with or without a controlled blow-off impulse, and/or free blow-off of the component, either freely or under position control.

In a variant of the device, position and property sensors are assigned in each case to the first turning device between the dispensing point and the transfer point, and/or to the second turning device between the transfer point and the deposit point. These sensors are set up to record position data and/or properties of the conveyed component and/or position data for position control of the manipulators (pick-ups) and the receiving points and to make them available for the control system.

In a variant of the component handling device, an integer number of n holders are assigned to the first and/or the second turning device. The number of holders of the first turning device and the number of holders of the second turning device can be the same or different.

In a variant of the component handling device, the first, second and/or third axes each include an angle of 90° plus/minus a maximum of 10° or 15° with respect to each other.

The position and property sensors can be imaging sensors with straight-line or bending optical axes.

In a variant of the component handling device, the first and/or second turning devices are at least approximately star-shaped or wheel-shaped. The turning devices can be precision-mounted and their positioning along the respective axes or about the respective axes can be effected by means of axially arranged linear or rotationally acting drive, paired with a high-resolution (for example rotational or linear) encoder. The respective holders can be arranged distributed around the outer circumference and have radially outward-facing suction contact points for the components to be conveyed.

One advantage of the axially offset arrangement of the turning devices relative to one another by about 90° is that, during the conveying process, the components perform a 90° rotation about the holder axis relative to the respective movement plane of the holder (or turning device axis) when being transferred from one turning device to the next, without the holder itself having to be mounted so that it can be moved in rotation. This change in orientation of the components in turn enables a significantly simplified inspection of the four component cut surfaces (=component side surfaces). For this purpose, a camera system arranged orthogonally to the plane of movement of the fixture (i.e. in the axial direction of the turning device) and preferably at a very short distance from the component cut surfaces (=lateral surfaces of the component) itself is used.

The variants presented here are more cost-effective compared to the state of the art and offer higher component throughput, more time for inspections and have fewer moving masses.

BRIEF DESCRIPTION OF THE DRAWINGS

Further features, characteristics, advantages and possible variants will become clear to a person skilled in the art from the following description, in which reference is made to the accompanying drawings. Here, FIGS. schematically show an optical inspection device for a component.

DETAILED DESCRIPTION OF THE EMBODIMENTS

Figure 1:
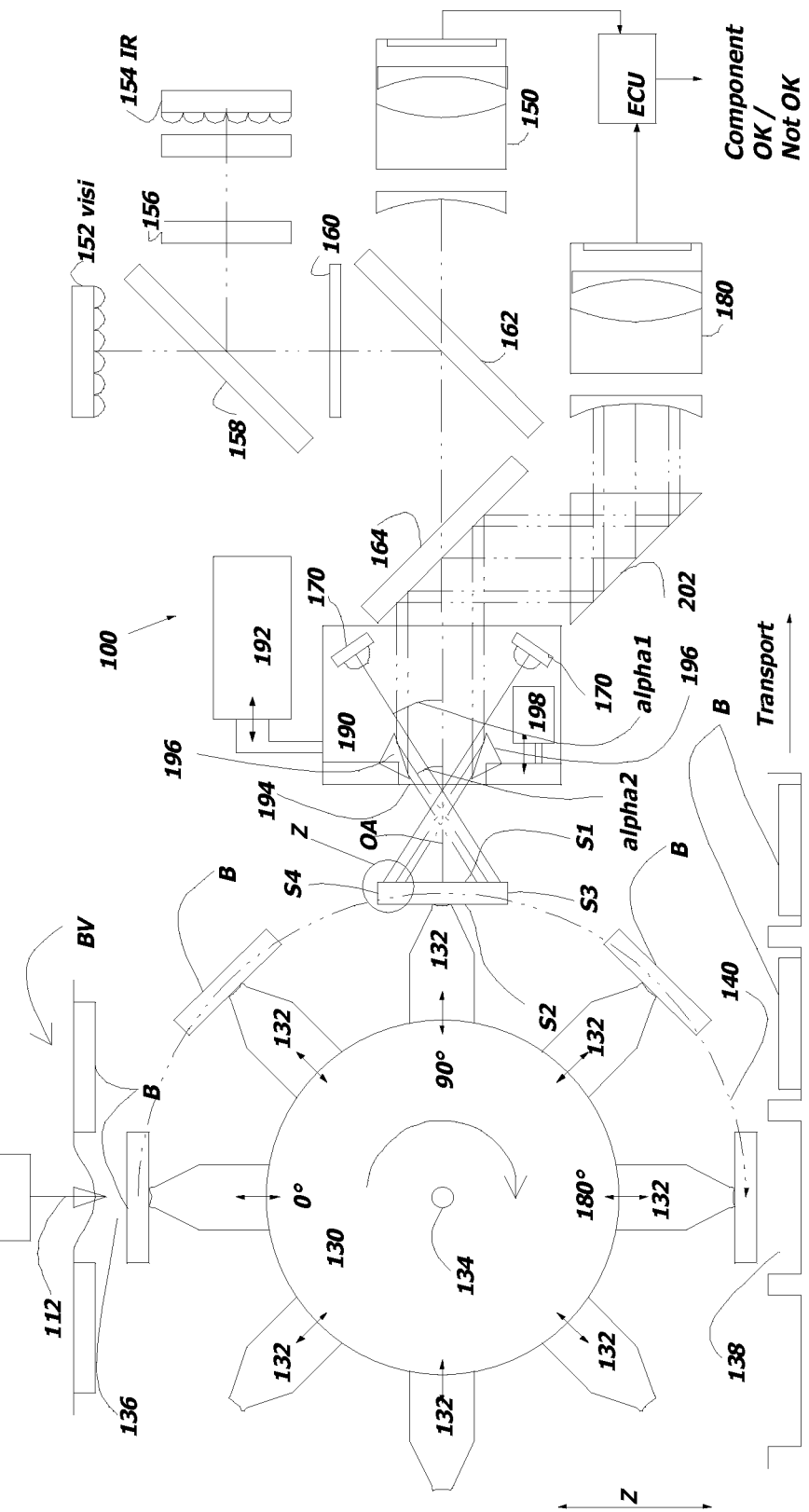
FIG. 1 shows a schematic side view of a device for optical inspection of a component which is conveyed by a turning device from a delivery position to a deposit position.

FIG. 1 illustrates an optical component inspection device 100 for inspecting a component B in the form of electronic semiconductor chips located at a holder 12. The component inspection device 100 presented here takes over the components B from a component supply BV, for example a wafer wafer, which is arranged horizontally in the upper region of the component inspection device 100 and is not shown in more detail. Possible input-output material at both positions could be tape or wafer, waffle pack, JEDEC tray, etc., or a mixture, e.g. wafer to tape or vice versa. Wafer to wafer or roll to roll solutions are also possible.

An ejection unit 110 operates here with a needle 112 controlled by a controller or it operates, for example, contactlessly with a laser beam to release the components B individually from the component supply BV so that they are fed to a first turning device 130. This first turning device 130 is in the form of a star or wheel and has, on its periphery, a plurality of holders 132 (eight in the example shown) for the separated components B. Each holder 132 is adapted, when it is closest to the ejection unit 110 at the 0° position of the first turning device 130, to receive the component B from the component supply BV at a delivery point 136, to convey it along a conveying path 140 to a deposition point 138, and to deposit it at the deposition point 138 at the 180° position of the first turning device 130.

The holders 132 are arranged facing radially outward on the (imaginary) circumference of the star-shaped or wheel-shaped first turning device 130 and carry the components B. In the variant shown, the holders 132 are suction pipettes which are controlled with respect to the axis of rotation 134 of the first turning device 130 and can be extended and retracted radially. The traverse control and the vacuum lines are not shown in FIG. 1 for the sake of clarity. Thus, these holders 132 can convey the components B, each fixed to one of the holders 132, within a swivel angle—here between 0° and 180°—between the component discharge point 136 and the component deposit point 138.

The first turning device 130 rotates the component B, controlled by the control system not further illustrated, about its axis of rotation to a first transfer point by a first predetermined angle, here 180°. In the process, the component B is turned about its longitudinal or transverse axis.

As illustrated in FIG. 1, the optical component inspection device 100 for optically inspecting the component B is arranged at the first turning device 130 in the inspection position (at 90° of the first turning device 130 in FIG. 1). A first imaging sensor 150 centrally directed to a first end face S1 of the component B remote from the holder 132 is used for inspecting the component B with light from an IR light source 154 and a visible light source 152. Light from the IR light source 154 passes through a Fresnel lens assembly 156 and is deflected 90° by a semi-transparent mirror 158 inclined 45° with respect to the optical axis. The semi-transparent mirror 158 also allows visible light from the light source 152 to pass through in a straight line. Both light beams (IR and visible light) pass through a diffuser 160 and strike another semi-transparent mirror 162 inclined at 45° to the optical axis, through which they are deflected by 90° in the direction of the component B. The light deflected in the direction of component B passes through a third semitransparent mirror 164 inclined at 45° to the optical axis OA and impinges on the first end face S1 of component B along optical axis OA. The light reflected therefrom is detected as an image by the imaging sensor 150 through the further semi-transparent mirror 162 and through the third semi-transparent mirror 164.

The holder 132 is guided from the delivery point 136 to the deposit point 138 along a path 140, along which the component conveyed by the holder passes the optical device described above with its light deflection and/or bundling devices. This optical device directs the light emerging from the first end face S1 of the component B towards the first imaging sensor 150.

The optical component inspection device 100 in FIG. 1 further comprises a plurality of light sources 170 that emit light, in particular IR light, that is incident on the first of the end faces S1 of the component B at a first acute angle alpha1 with respect to the optical axis OA of a second imaging sensor 180 when the component B located at the holder 132 is oriented with the first of its end faces S1 at least approximately normal (about 90°±about 10°) to the optical axis OA of the imaging sensor 180. The imaging sensor 180 can thus be used to optically inspect at least one of the side surfaces S3, S4 of the component B conveyed through the holder 132 and at least one region in the interior of the component B near a second of the end surfaces S2 and near respective ones of the side surfaces S3, S4. At least one of the side surfaces is inspected from the inside for its irregularities in the solution shown here by reflecting the light rays off the inner side of the side surface (see also FIG. 4). Thus, no further imaging sensor is required to inspect external unevenness. All laser groove damage can thus be inspected using the same light beams and imaging sensor. In the variant shown here, the two imaging sensors 150 and 180 are similar or identical in design. Depending on the light used, the spectral sensitivity of the imaging sensors 150 and 180 is matched to the respective light sources.

As illustrated in FIG. 1, there is a support unit 190 arranged radially outside the 90° position of the first turning device 130. This support unit 190 has a substantially L-shaped form, whereby a leg of the L oriented towards the holder 132 is aligned approximately parallel to a component located on the holder 132. In this leg of the L of the support unit 190 oriented toward the holder 132 is a through aperture 194 through which the optical axis OA extends centrally. A plurality of, in this case four, light deflection devices 196 in the form of prisms are arranged at the edge of the through aperture 194. The support unit 190 is to be moved or adjusted along the optical axis OA of the imaging sensor 150 by a drive 192, whereby the entirety of the light deflection devices 196 is to be displaced along the optical axis OA. A further adjustment device 198 is provided for a selection of the plurality, here 2 of the 4, of light redirecting devices 196 to be displaced along the optical axis OA. Thus, in each case, two light deflection devices 196 located opposite each other at the periphery of the through aperture 194 are to be focused together on the desired image plane in/at the component B.

The support unit 190 thus supports both the light deflecting devices 196 and the respective light sources 170. The light coming in each case from one of the light sources 170 falls (through the through aperture 194) at the angle alpha1 onto the first end face S1 of the component B, penetrates through the first end face S1 into the component B, is reflected inside the component at the inner side of the corresponding side face S3, S4 . . . to the inner side of the second end face S2 and from there back to the first end face S1, provided that (i) the respective side face has a continuously smooth cut surface, and (ii) no layers of the semiconductor structure in the component B peel off at the inner side of the second end face S2, in particular in the edge or edge region to the respective side face. At the first end face S1, the light exits the component B again at the angle alpha2 and falls (through the through aperture 194) at the angle alpha2 onto the associated one of the light redirecting devices 196. From there, the light reaches the third semi-transparent mirror 164, which is inclined at 45° to the optical axis and redirects the light onto a fourth light redirecting device (prism) 202, which is inclined at 45° to the optical axis and in turn feeds the light to the imaging sensor 180. Light from both light sources 152 and 154 also passes through the through aperture 194. A portion of the beams from the IR light source 154 are also co-deflected at the prisms 196 and may serve secondarily for laser groove inspection. These light beams also pass through the through aperture 194. In this case, the IR light source 170 (IR ring light) is the primary IR light source for laser groove inspection and is positioned at an angle to further better illuminate and target the laser groove areas for inspection.

In the variant shown here, each of the light sources 170 is to be oriented so that, when a component B is inspected as being "in order" with respect to irregularities on a side surface S3, S4 of the component B and/or detachments of at least one layer in the region of a second of the end faces S2, the light emerges from the first of the end faces S1 of the component B at a second acute angle alpha2 to the optical axis of the imaging sensor 180 in such a way that the magnitude of the second acute angle alpha2 deviates at most slightly from that of the first acute angle alpha1. In the variant shown in FIG. 1 *ff*, the two angles alpha1 and alpha2 are practically identical.

In FIG. 1, the light source 170 on the support unit 190 is located on the side of the through aperture 194 away from the holder 132. Thus, both the light from the light source 170 and the light returning to the imaging sensor 180 pass through the through-hole 194. In a variant not further illustrated, the light source 170 is arranged on the support unit 190 on the side of the through-hole 194 facing the holder 132. In this case, only the light returning to the imaging sensor 180 passes through the through aperture 194.

Figure 2:
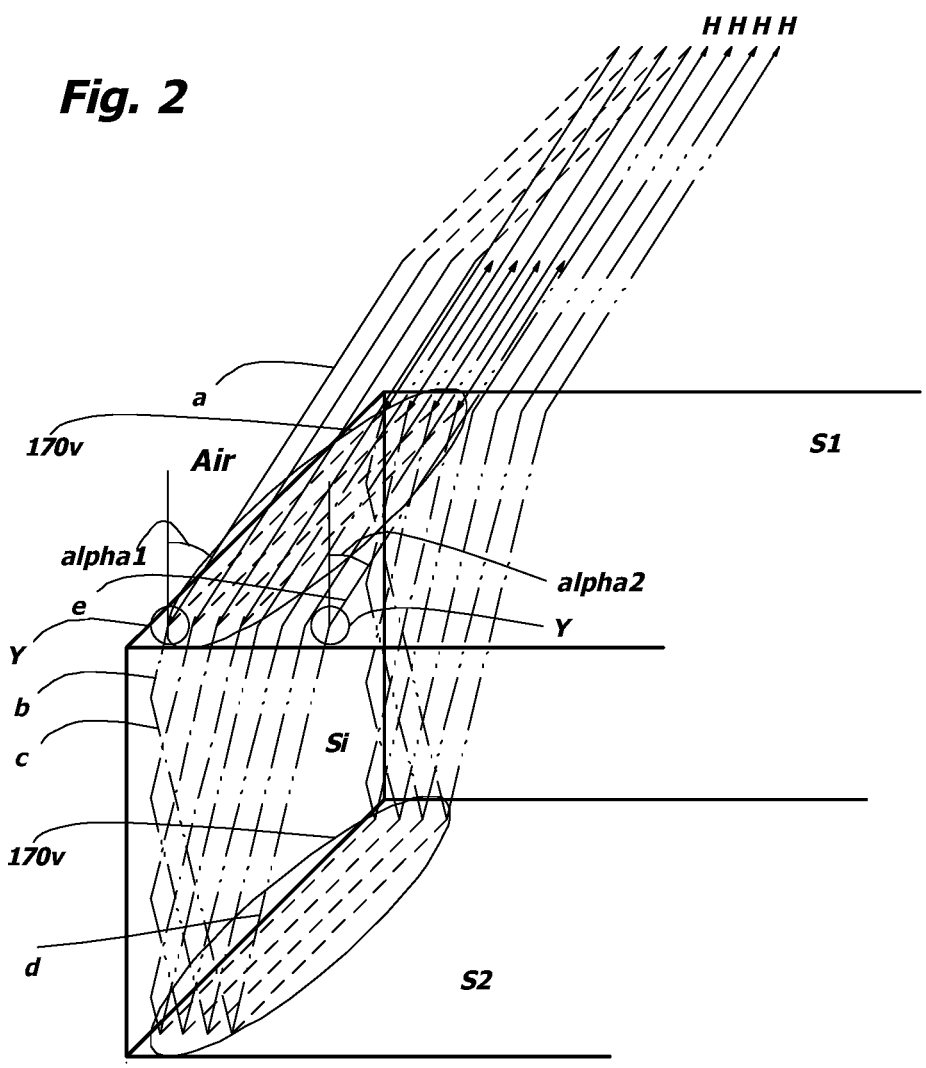
FIGS. 2-4 show the detailed situation Z circled in FIG. 1 for penetration of the component by light and the light path as well as its variants inside the component rotated 90° counterclockwise.
Figure 2A:
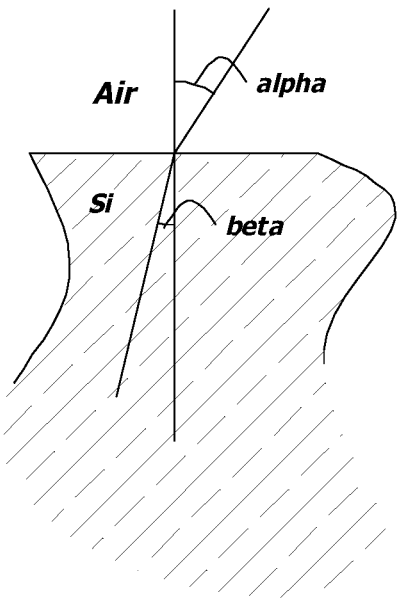
FIG. 2a explains the detail situation Y when the light beam enters/exits the first end face S1 and is reflected from the second end face S2 of the component B.
Figure 3:
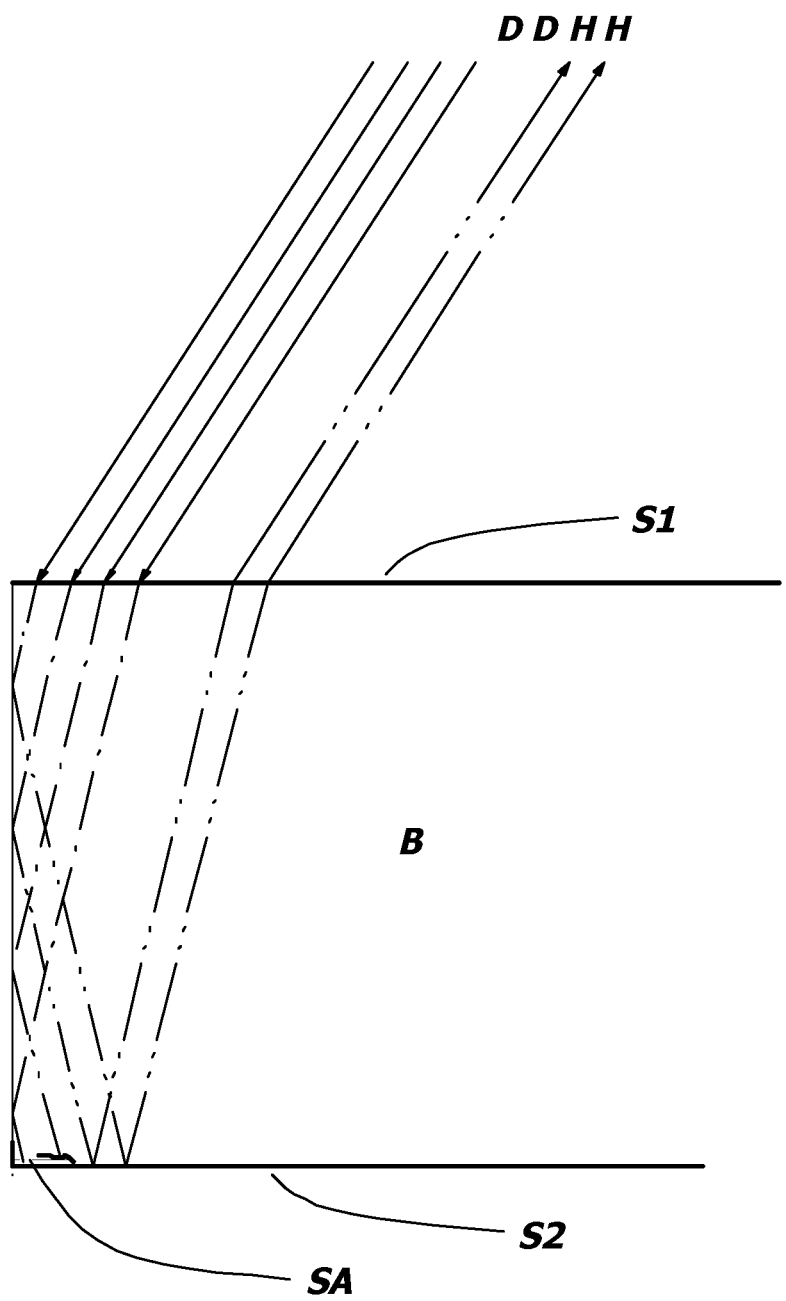
Figure 4:
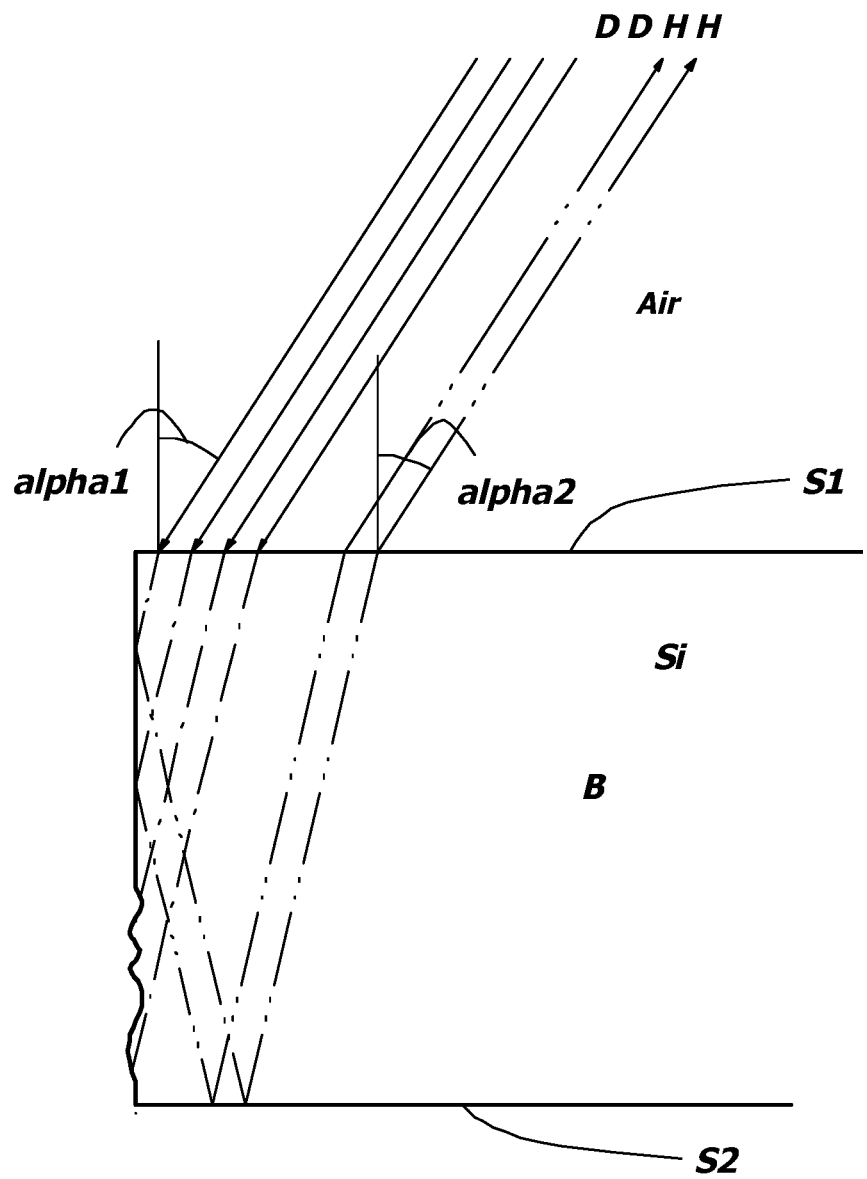

The detailed situation Z circled in FIG. 1 concerning the penetration of the component B by light and the light path as well as its variants inside the component B are illustrated in FIGS. 2-4 (rotated 90° counterclockwise). FIG. 2a explains the detailed situation Y when the light beam enters/exits the first end face S1 and is reflected by the second end face S2 of the component B.

Thus, FIG. 2 shows the path through an undamaged component B in which light coming from one of the light sources 170 is (b) depending on the refractive index (n) of the material—in the example silicon Si—of the component B, the temperature and the wavelength of the light deflected by the first end face S1 penetrates into the component B, (c) is reflected inside the component on the inside of the corresponding side face S3, S4 ... is reflected onto the inner side of the second end face S2, (d) is reflected from there back to the first end face S1, (e) depending on the refractive index of the material of the component B, the temperature and the wavelength of the light, deflected, emerges at the angle alpha2 from the first end face S1 of the component B to the associated one of the light deflection means 196, and takes the path to the imaging sensor 180, provided that (i) the respective side face has a continuously smooth cut surface, and (ii) no layers of the semiconductor structure in the component B are detached (from each other) at the inner side of the second end face S2 (in particular in the edge or edge region to the respective side face). This results in an emerging light pattern Light Light Light, H H H. It is to be understood that this light pattern, illustrated here merely from four light beams, can also be represented with intervening dark stripes in the case of a component inspected as being in order, depending on the geometric conditions. If the light pattern is interrupted at individual points along the length of the light strip 170v, this indicates a local layer detachment or unevenness.

In this case, the acute angle alpha1 of the light directed to the component B is determined between about −45° and about +45°, between about +5° and about +45°, between about +15° and about +45°, between about +25° and about +45°, or between about +30° and about +45°, depending on the refractive index n of the material of the component B, the wavelength and/or the height of the component. In the variant shown in FIGS., the light source 170 is adapted to emit infrared light having a wavelength between about 780 nm and about 1000 nm (for example, 900 nm). Light with SWIR (short wave IR) up to about 1500 nm can also be used. Since components B generally have a silicon-containing substrate material, and the temperature of the substrate material is about 300° K±about 10° K, the acute angle alpha1 of the light directed onto the component is determined to be about 33°±about 3° in the variant illustrated here.

The imaging sensor 180 detects the light emerging from the first end face S1 of the component B and signals a distribution of the intensity of the emerging light to an evaluation device not further illustrated, a computer unit programmed for image data processing. In particular, depending on the signaled distribution of the intensity of the light emerging from the first end face S1 of the component B, the evaluation device detects unevenness at least in sections on a side face of the component B and/or detachment of at least one layer in sections in the region of a second end face S2.

As illustrated in FIG. 2, the light source 170 provides a light strip 170v that is incident on the first end surface S1 of the component B at the first acute angle alpha1 in an edge region of the component B to be inspected.

In the present configuration, the light source 170 provides the infrared light with a wavelength of about 900 nm; the component has a silicon-containing substrate material and the temperature of the substrate material is about 300° K±about 10° K; in this case, the first acute angle alpha1 of the light directed to the component B is about 33°±about 3°. SWIR (short wave IR) up to about 1500 nm can also be used.

The deviation of the magnitude of the second acute angle alpha2 from that of the first acute angle alpha1 is no more than about ±5°.

FIG. 3 illustrates how a flat or smooth cut surface on the side of the component B, in conjunction with a detachment in the edge region between the side surface and the second end surface S2 of the component B, affects the light pattern detected by the imaging sensor 180. It is evident that the light from the smooth side surface is deflected completely onto the second end surface S2. However, in the region of the layer separation SA in the edge region between the side surface and the second end surface S2 of the component B, the light is not reflected to the first end surface S1. This results in the light pattern Dark Dark Light Light, D D H H.

FIG. 4 illustrates how an uneven cut surface on the side of the component B in the edge region between the side surface and the second end surface S2 of the component B affects the light pattern detected by the imaging sensor 180. Obviously, the light is completely deflected from the side surface, which is smooth in the upper region, to the second end surface S2, and is reflected from there to the first end surface S1. However, in the edge region between the side surface and the second end surface S2 of the component B, the light is not deflected to the second end surface S2, and consequently is not reflected to the first end surface S1. This results in the light pattern Dark Dark Light Light, D D H H.

In the variant illustrated in FIG. 1, the holder 132 is part of the first turning device 130, which rotates about the first turning axis 134. The component B is picked up at the first delivery point, conveyed to the first deposit point, and deposited there. In a variant not shown further, the holder 132 is part of a second turning device that rotates about a second turning axis and picks up the component B at a holder point from a holder of the first turning device 130, conveys it to a second deposit point, and deposits it at the second deposit point. The first turning axis and the second turning axis are spaced apart from each other (in the Z direction) and offset from each other by an angle of approximately 90°. At the transfer point, the holder of the second turning device and the holder of the second turning device are aligned with each other in such a way that the component is to be transferred from the first turning device to the second turning device.

The variants of the device described above, as well as its construction and operating aspects, are merely intended to provide a better understanding of the structure, operation and features; they do not limit the disclosure to the variants, for example. The FIGS. are partially schematic, with significant features and effects shown, in some cases significantly enlarged, to illustrate the functions, operating principles, technical variants and features. In this regard, any mode of operation, principle, technical variant and feature disclosed in the FIG. or in the text may be freely and arbitrarily combined with any claims, feature in the text and in the other FIG., other modes of operation, principles, technical variants and features contained in or resulting from the present disclosure, so that all conceivable combinations are attributable to the described approach. Combinations between all individual variants in the text, that is, in each section of the description, in the claims, and also combinations between different variants in the text, in the claims, and in the FIGS. are included. Also, the claims do not limit the disclosure and thus the possible combinations of all disclosed features with each other. All disclosed features are also explicitly disclosed herein individually and in combination with all other features.

The invention claimed is:

1. An optical component inspection device for inspecting a component located at a holder, wherein
   the holder is set up to receive the component at a first delivery point, to convey the component along a conveying path to a first deposition point, and to deposit it the component at the deposition point;
   a light source is arranged to emit light which is incident at a first acute angle to an optical axis of an imaging sensor on a first end face of the component when the component located at the holder is oriented with the first end face at least approximately normal to the optical axis of the imaging sensor;
   the imaging sensor is set up to optically inspect at least one side surface of the component conveyed through the holder and/or at least one region in an interior of the component near a second end face and near the side surfaces;
   the imaging sensor is set up to detect the light emerging from the first end face of the component and to signal a distribution of the intensity of the emerging light to an evaluation device;
   the evaluation device is set up as a function of the signaled distribution of the intensity of the emerging light, to detect, at least in sections, unevennesses on a side face of the component and/or sectional detachments of at least one layer in the region of the second end face; and
   a support unit having a through aperture located in the support unit is provided for supporting a plurality of light deflecting devices.

2. The optical component inspection device for inspecting a component located at a holder according to claim 1, wherein:
   the holder pick-up is guided from the first delivery point to the first deposition point on a path on which the component conveyed through the holder passes an optical device comprising one or more deflecting and/or bundling devices arranged to deflect light emerging from the first end face of the component towards the imaging sensor.

3. The optical component inspection device for inspecting a component located at a the holder according to claim 1, wherein
   the light source is arranged to supply at least one light strip which is incident at the first acute angle in an edge region of the component onto the first end face of the component.

4. The optical component inspection device for inspecting a component located at a the holder according to claim 1, wherein the light source is oriented such that
   the first acute angle of the light directed onto the component is determined in such a way that, in the case of a component inspected as being in order, light coming from the light source
   (a) falls at the first acute angle onto the first end face of the component,
   (b) depending on the refractive index of the component, the temperature and the wavelength of the light deflected by the first end face penetrates into the component,
   (c) is reflected inside the component at the inner side of the corresponding side surface onto the inner side of the second end surface,
   (d) is reflected from the inner side of the second end surface back to the first end surface,
   (e) depending on the refractive index of the component, the temperature and the wavelength of the light, is deflected and emerges at a second acute angle from the first end face of the component to the associated one of the light deflecting devices, and takes the path to the imaging sensor, provided that
   (i) the respective side face has a substantially smooth cut surface throughout, and
   (ii) no layers of a semiconductor structure in the component peel off at the inner side of the second end face.

5. The optical component inspection device for inspecting a component located at a holder according to claim 1, wherein
   the first acute angle of the light directed onto the component is determined as a function of the refractive index of the component, the wavelength and/or the height of the component between about −45° and about +45°, between about +5° and about +45°, between about +15° and about +45°, between about +25° and about +45°, or between about +30° and about +45°.

6. The optical component inspection device for inspecting a component located at a holder according to claim 4, wherein
   the light source is arranged to emit infrared light with a wavelength between about 780 nm and about 1000 nm or SWIR (short wave IR) up to about 1500 nm, and in the case that the component comprises a silicon-containing substrate material and the temperature of the substrate material is about 300° K±about 10° K, the first acute angle of the light directed onto the component is about 33°±about 3° and/or
   the incident light emerges at the second acute angle to the optical axis of the imaging sensor from the first end face of the component facing away from the holder towards the imaging sensor in such a way that the magnitude of the second acute angle deviates slightly from that of the first acute angle.

7. The optical component inspection device for inspecting a component located at a holder according to claim 6, wherein
the deviation of the magnitude of the second acute angle from the first acute angle is not more than about ±10°.

8. The optical component inspection device for inspecting a component located at a holder according to claim 1, wherein
the holder is part of a first turning device which is arranged to rotate about a first turning axis and thereby to pick up the component at the first delivery point, to convey the component to the first deposition point, and to deposit the component at the first deposition point; and/or
the holder is part of a second turning device which is set up to rotate a second turning axis and at the same time to take over the component at a takeover point from the holder of the first turning device, to convey it to a second deposition point, and to deposit it at the second deposition point, wherein the first turning axis and the second turning axis are spaced apart from one another and are offset from one another by an angle of approximately 90°, and wherein at the transfer point the holder of the first turning device and the holder of the second turning device are aligned with one another in such a way that the component is transferred from the first turning device to the second turning device.

9. The optical component inspection device for inspecting a component located at a holder according to claim 2, wherein
the holder is guided from the first delivery point to the first deposition point on a path on which the component conveyed by the holder passes the optical device, and/or
the optical device comprises one or more light redirecting and/or focusing means arranged to redirect light emerging from the first end face of the component towards the imaging sensor.

10. The optical component inspection device for inspecting a component located at a holder according to claim 2, wherein
the distance between the holder passing through the optical device and the light deflecting and/or focusing devices is varied in such a way that the component conveyed by the holder can be optically detected by the imaging sensor at least between the first and the second end faces of the component along the optical axis of the imaging sensor.

11. The optical component inspection device for inspecting a component located at a holder according to claim 2, wherein
the light deflecting devices are arranged around the through aperture, the support unit is moved or adjusted along the optical axis of the imaging sensor, whereby the plurality of light deflecting devices are displaced along the optical axis of the imaging sensor;
an adjustment device for a selection of the plurality of light deflecting devices is arranged to displace this selection along the optical axis of the imaging sensor; and/or
the support unit is arranged to support at least one light source for each of the light deflecting devices arranged around the through aperture, the at least one light source being arranged on the support unit in such a way that light emitted by it falls through the through aperture, onto the first end face of the component to be inspected as it passes the optical device.

12. An optical component inspection method for inspecting a component located on a holder, comprising the steps of:
picking up the component at a first delivery point, conveying the component along a conveying path to a first deposition point location, and depositing the component at the first deposition point;
emit light from a light source that is incident on a first end face of the component at a first acute angle with respect to an optical axis of an imaging sensor;
orient the light source such that, in the case of the component inspected as being in order with respect to unevenness on a side surface of the component and/or detachment of at least one layer in the region of a second end face, the light emerges from the first end face of the component at a second acute angle to the optical axis of the imaging sensor such that the magnitude of the second acute angle deviates slightly from the first acute angle;
using the imaging sensor to optically inspect at least one of the side surfaces of the component conveyed through the holder and/or at least one region in an interior of the component near the second end face and near respective ones of the side surfaces;
using the imaging sensor to detect the light emerging from the first end face of the component and to signal a distribution of the intensity of the emerging light to an evaluation device; and
using the evaluation device, as a function of the signaled distribution of the intensity of the emerging light, to detect, at least in sections, unevenness on a side face of the component and/or, at least in sections, detachments from at least one layer of a semiconductor structure in the component in the region of the second end face; wherein
a support unit having a through aperture located in the support unit is provided for supporting a plurality of light deflecting devices.

13. The optical component inspection method for inspecting a component located on a holder according to claim 12, further comprising the step of:
guide the holder from the delivery point to the first deposition point on a path on which the component conveyed through the holder passes an optical device comprising one or more deflecting and/or focusing means which direct light emerging from the first end face of the component towards the imaging sensor.

14. The optical component inspection method for inspecting a component located on a holder according to claim 12, further comprising the step of:
supplying at least one light strip from the light source, the light strip falling at the first acute angle in an edge region of the component onto the first end face of the component.

15. The optical component inspection method for inspecting a component located on a holder according to claim 12, further comprising the step of:
the first acute angle of the light directed onto the component is determined as a function of the refractive index of the component, the wavelength and/or the height of the component, between about −45° and about +45° between about +5° and about +45°, between about +15° and about +45°, between about +25° and about +45°, or between about +30° and about +45°.

16. The optical component inspection method for inspecting a component located on a holder according to claim 15, further comprising the step of:

emit infrared light from the light source having a wavelength between about 780 nm and about 1000 nm or SWIR to about 1500 nm, and in the case where the component has a silicon containing substrate material and the temperature of the substrate material is about 300° K±about 10° K, determine the first acute angle of the light directed to the component to be about 33°±about 3°.

17. The optical component inspection method for inspecting a component located on a holder according to claim 12, wherein:
the deviation of the magnitude of the second acute angle from that of the first acute angle is not more than about ±5°.

18. The optical component inspection method for inspecting a component located on a holder according to claim 12, wherein:
the first acute angle of the light directed onto the component is determined in such a way that, for a component inspected as being in order, light coming from one of the light sources
(a) falls at the first acute angle onto the first end face of the component,
(b) depending on the refractive index of the component, the temperature and the wavelength of the light deflected by the first end face penetrates into the component,
(c) is reflected inside the component on the inside of the corresponding side face onto the inside of the second end face,
(d) is reflected from the inside of the second end face back to the first end face,
(e) depending on the refractive index of the component, the temperature and the wavelength of the light, deflected at the second acute angle, emerges from the first end face of the component to the associated one of the light deflecting devices, and takes the path to the imaging sensor, provided that
(i) the respective side face has an at least approximately continuously smooth cut surface, and
(ii) no layers of the semiconductor structure in the component peel off on the inside of the second end face.

19. The optical component inspection method for inspecting a component located on a holder according to claim 12, wherein:
the holder rotates about a first turning axis at a first turning device, thereby picking up the component at the first delivery point, conveying the component to the first deposition point, and depositing it the component at the first deposition point; and/or
the holder rotates about a second turning axis at a second turning device and in so doing receives the component at a transfer point from the holder of the first turning device, conveys the component to a second deposition point, and deposits the component at the second deposition point, the first turning axis and the second turning axis being spaced apart from one another, and are offset from one another by an angle of approximately 90°, and wherein at the transfer point the holder of the first turning device and the holder of the second turning device are aligned with one another in such a way that the component is transferred from the first turning device to the second turning device.

20. The optical component inspection method for inspecting a component located on a holder according to claim 12, wherein:
the holder is guided from the first delivery point to the first deposition point along a path on which the component conveyed by the holder passes an optical device, and/or
one or more light redirecting and/or focusing means of the optical device direct light emerging from the first end face of the component towards the imaging sensor.

21. The optical component inspection method for inspecting a component located on a holder according to claim 13, wherein:
the holder passing through the optical device and the light deflecting and/or focusing means are varied in their distance from one another in such a way that the component conveyed by the holder is optically detected by the imaging sensor at least in its interior between the first and second end faces of the component along the optical axis of the imaging sensor.

22. The optical component inspection method for inspecting a component located on a holder according to claim 12, wherein:
the light deflecting devices are arranged around the through aperture,
the support unit is moved or adjusted along the optical axis of the imaging sensor, whereby the entirety of the plurality of light deflecting devices is displaced along the optical axis of the imaging sensor,
an adjusting device displaces a selection of the plurality of light deflecting devices along the optical axis of the imaging sensor, and/or
the support unit carries at least one light source for each of the light deflecting devices arranged around the through aperture, the at least one light source being arranged, on the support unit in such a way that light emitted by it, preferably through the through aperture, falls onto the first end face of the component to be inspected as it passes the optical device.

* * * * *